United States Patent

Harrison

[11] Patent Number: 6,056,308
[45] Date of Patent: May 2, 2000

[54] TOOL HITCH ADAPTOR FOR VEHICLES

[76] Inventor: Ronald Henry Harrison, 58 Rte. 39, Sherman, Conn. 06784

[21] Appl. No.: 08/993,814

[22] Filed: Dec. 18, 1997

[51] Int. Cl.[7] .................................................. B60D 1/07
[52] U.S. Cl. ..................................... 280/416.1; 280/460.1
[58] Field of Search ............................. 280/416.1, 415.1, 280/416.2, 476.1, 460.1; 224/519

[56] References Cited

U.S. PATENT DOCUMENTS

| | | | |
|---|---|---|---|
| 836,975 | 2/1906 | Johnson | 280/415.1 |
| 3,093,394 | 6/1963 | McCollum | 280/493 |
| 3,837,677 | 9/1974 | Haskins | 280/476 |
| 3,905,619 | 9/1975 | Sylvester | 280/415.1 |
| 4,046,398 | 9/1977 | Dunwoody | 280/415.1 |
| 4,202,562 | 5/1980 | Sorenson | 280/415.1 |
| 4,546,994 | 10/1985 | Taylor | 280/423 |
| 4,744,590 | 5/1988 | Chesney | 280/769 |
| 4,906,105 | 3/1990 | LaCroix et al. | 280/415.1 |
| 5,306,037 | 4/1994 | Robertson | 280/495 |
| 5,476,279 | 12/1995 | Klemetsen | 280/415.1 |
| 5,478,124 | 12/1995 | Warrington et al. | 293/125 |
| 5,516,140 | 5/1996 | Hinte | 280/494 |
| 5,685,554 | 11/1997 | Poxlietner | 280/491.2 |
| 5,690,182 | 11/1997 | Ward | 172/439 |
| 5,709,274 | 1/1998 | Herbold | 172/248 |
| 5,765,851 | 6/1998 | Parent | 280/491.4 |
| 5,775,560 | 7/1998 | Zahn et al. | 224/524 |
| 5,853,187 | 12/1998 | Maier | 280/495 |

*Primary Examiner*—Kevin Hurley
*Assistant Examiner*—Andrew J. Fischer
*Attorney, Agent, or Firm*—Hosmer & Reiter; Howard S. Reiter

[57] ABSTRACT

An adaptor assembly for mounting auxiliary tools and attachments on vehicles includes a plate having a rectangular tubular mounting sleeve extending at right angles from one side thereof and a pair of receiving channels defined by parallel spaced apart sidewall members extending from the other side thereof. The receiving channels receive and engage the mounting blades of a conventional vehicular snow plow hitch, so as to support the rectangular mounting sleeve in substantial alignment with the longitudinal axis of a vehicle. The mounting sleeve, thus securely attached to the vehicle, allows auxiliary apparatus or "tools" having rectangular mounting "prongs" to be quickly and easily attached to and separated from a vehicle in place of a snow plow, without precluding rapid repositioning of a snow plow when desired.

2 Claims, 1 Drawing Sheet

TOOL HITCH ADAPTOR FOR VEHICLES

BACKGROUND OF THE INVENTION

This invention relates generally to means for quickly and conveniently coupling and uncoupling auxiliary apparatus on motor vehicles and similar base structures, and more specifically relates to mounting devices that allow auxiliary apparatus, often identified as "tools", such as trailer hitches, winch assemblies and carry/support structures including boat and bicycle racks, to be substituted readily for commonly used snow plow blade assemblies.

Devices intended to facilitate attachment and detachment of snow plow blades on the motor vehicles with which they are used, are well known. A known form of mounting device, manufactured by Douglas Dynamics, Inc., of Milwaukee Wis., utilizes a pair of mounting frames permanently attache to the chassis of a motor vehicle, generally proximate to the front bumper. For the purposes of the present invention, it should be understood that suitable mounting frames of this known type may be mounted to a vehicle in the vicinity of either the front bumper or the rear bumper, or two separate sets of such frames may be mounted to the vehicle, one set each in the vicinity of each bumper.

A mounting frame of this known type characteristically comprises a blade-like push plate member that is affixed to a vehicle so that it projects forwardly, or rearwardly, from the vehicle frame in proximity with the vehicle bumper, and in generally parallel relationship with the axis of the vehicle. The plane of the push plate blade is vertically aligned to provide optimum strength for supporting the primarily vertical load represented by a snow plow assembly. And, to assure that the assembly remains affixed to the blade of the mounting frame, an aperture is provided, extending through the blade, to receive a locking pin that is passed through both the blade and the parts of the snow plow assembly that mate with the blade, in the manner described later in this specification.

In practice, snow plow assemblies are mounted to vehicles using a pair of mounting frames of this type, comprising a mounting set. The set of frames are affixed to the vehicle in parallel, spaced apart relationship, a given distance apart, most often equally spaced on either side of the center line of the vehicle. However, because of the complexity, cost and difficulty of using mounting frame sets of this type for apparatus other than snowplow assemblies, such use is generally avoided. The present invention interacts with mounting frame sets of this configuration to provide means by which auxiliary and/or accessory structures may be readily coupled to and detached from, a vehicle without involving manipulation of the mounting frame set.

Accordingly, it is an object of this invention to provide a mounting adaptor for engaging snow plow mounting frame members on a vehicle so that accessory structures may readily be coupled to, and detached from, the vehicle.

It is a further object of this invention to provide a mounting adaptor for engaging a pair of parallel spaced-apart blade members mounted on a vehicle, so that accessory structures may readily be coupled to, and detached from, the vehicle.

It is still another object of this invention to provide a mounting adaptor that permits accessory structures to readily be coupled to, and detached from, a set of snow plow mounting frames without requiring alteration of the set of frames or otherwise interfering with routine detachment and reattachment of a snow plow assembly.

A feature of this invention provides for coupling to a mounting frame set, an adaptor having a plate bearing a receiver hitch of known design, such that auxiliary structures may be readily attached and detached to and from the receiver hitch without separating the hitch from the frame sets that are mounted to a vehicle or otherwise necessitating manipulation of the frame set or its support structure.

These and other and further objects, features and advantages of this invention will be made obvious to those having skill in this art by reference to the following specification and the accompanying drawings in which:

DETAILED DESCRIPTION OF THE INVENTION

Figure 3:
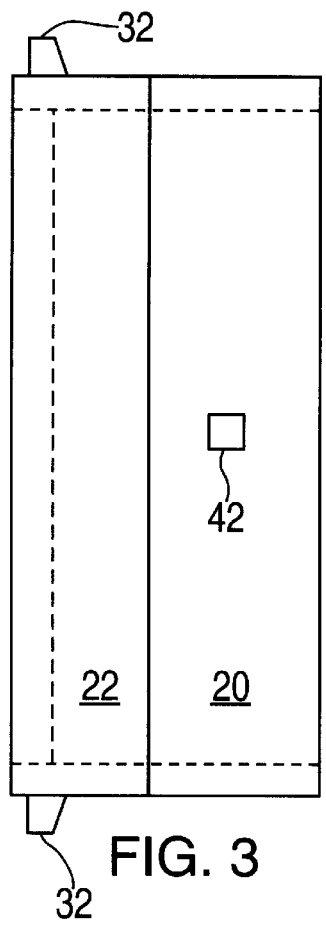
FIG. 3 is a front orthogonal view of a mounting adaptor in accordance with this invention.
Figure 2:
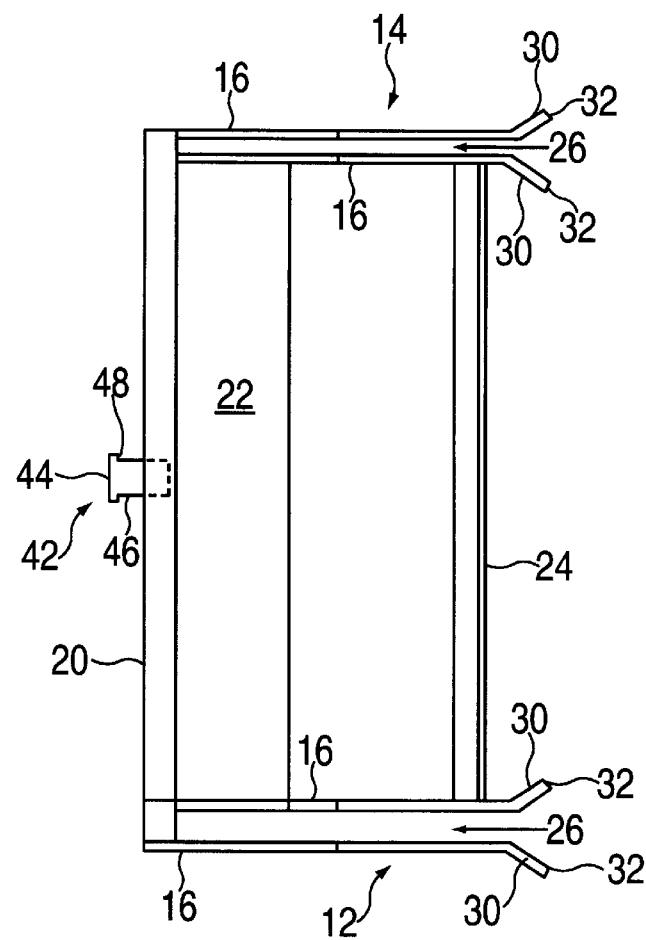
FIG. 2 is a top orthogonal view of a mounting adaptor in accordance with this invention.
Figure 1:
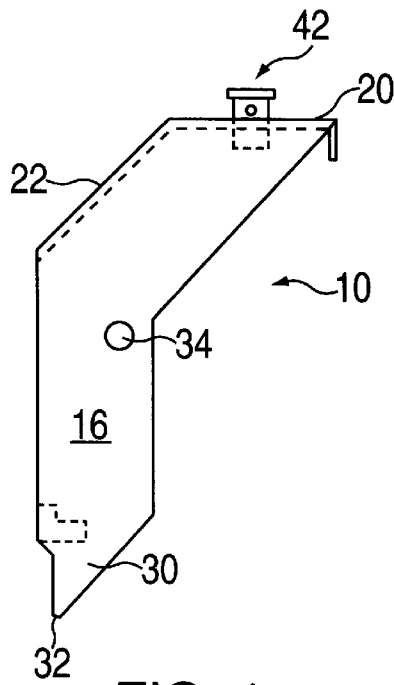
FIG. 1 is a side orthogonal view of a mounting adaptor in accordance with this invention.

Referring now more particularly to FIGS. 1 and 2 of the drawings, a mounting adaptor 10 in accordance with this invention may be seen to comprise two spaced-apart pairs 12,14 of sidewall plates 16. Sidewall plates 16 in the form of pairs 12, 14 are each fixedly attached to a front plate 20 and a reinforcing plate 22 to maintain the structural rigidity of the adaptor as well as the predetermined positional relationship of the plates 16 and the pairs of plates 12,14 to each other. A forward spacer bar 24 extends between the innermost two of sidewalls 16, to provide additional rigidity and support.

It can be seen most clearly in FIG. 2 that each pair of sidewalls 16 together define a central blade receiving channel 26, between the two side wall members. Outwardly diverging end portions 30 at the free ends 32 of the paired wall members 16 form a funnel shaped-entrance to channel 26 for facilitating insertion of a mounting blade 36 into channel 26. Further, to assure retention of the blade 36 within the channel 26, each one of sidewalls 16 is provided with a pin receiving apertures 34, and the apertures 34 in each pair of sidewalls 16 are positioned in coaxial alignment with each other. Mounting blades 36 conventionally are provided with a pin-receiving aperture 37, and apertures 34 in sidewalls 16 are positioned so that a retention pin 38 may be inserted coaxially through the apertures 34 and through the corresponding aperture 37 in blade 36 so as to secure the blade 36 within the channel 26.

Sidewalls 16 are shaped as shown in FIG. 1 so that the plane of front plate 20 will be supported in substantially vertical orientation when the adaptor 10 is fully engaged with the mounting blades 36 that are affixed to a vehicle. Supporting front plate 20 in a vertical plane facilitates engagement of accessory structures [not shown] with the mounting sleeve 42 that is fixedly attached to plate 20. Sleeve 42 extends from front plate 42 in a substantially perpendicular direction and, has a generally rectangular tubular cross section transverse to its longitudinal direction, and a generally mushroom-cap configuration characterized by an enlarged diameter head portion 44 that extends radially beyond the outer diameter of body portion 46 to define an enlarged annular collar having a larger diameter than the outer diameter of said sleeve.

Figure 4:
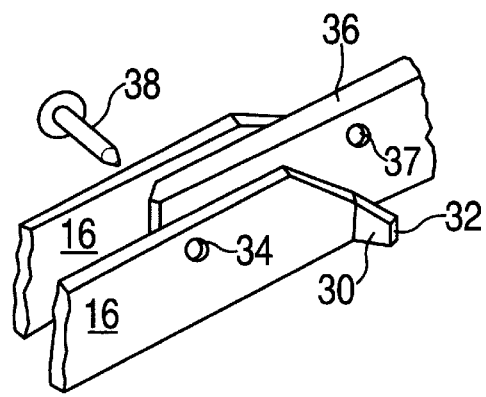
FIG. 4 is a partial pictorial representation showing how the adaptor of FIGS. 1 through 3 is coupled to a mounting frame element.

The central opening 50 defined by the interior of the sleeve 42 is configured to telescopically receive a mounting prong [not shown] extending from any auxiliary apparatus/ accessory device that one may wish to mount to a vehicle bearing the adaptor of this invention. In use, any accessory device may be readily attached to sleeve 42 by providing the accessory with a suitably dimensioned and positioned rectangular "prong" extension. The "prong" is received telescopically within the opening 50 and is provided with a transverse opening extending completely therethrough that may be positioned in alignment with the transverse opening 52 in sleeve 42; when the opening 52 in sleeve 42 is aligned with the opening in an inserted prong, a locking pin [not shown] that may be identical to pin 38 [shown in FIG. 4, herein] is inserted through the aligned openings to lock the inserted prong within the receiving tube so as to preclude inadvertent withdrawal or separation of the mounted auxiliary apparatus from the adaptor. The mating rectangular cross sections of opening 50 and an inserted "prong" further stabilize the mounted apparatus by preventing rotation of the prong about its longitudinal axis, so that the mounted apparatus precluded effectively from moving independent of the receiving sleeve 42.

The enlarged head portion 44 of sleeve 42 serves as reinforcement for the body portion 46 of the sleeve so as to avoid unintended enlargement or other deformation of the receiving end of opening 50; such deformation is undesirable because it is likely to contribute to overall failure of the sleeve under load conditions that may reasonably be expected in ordinary use.

Sleeve 42 is shown extending through an opening in plate 20 so that prongs telescopically received within the sleeve may extend completely through, and project beyond, both ends of the sleeve. However, it will be readily recognized by those having skill in this art that sleeve 42 may be fastened to the surface of plate 20 so that central opening 50 becomes, in effect, a "blind" hole with the surface of plate 20 defining the "blind" wall at the bottom of the hole.

Although a single embodiment of the invention has been illustrated and described, it will be obvious to those having skill in this art that various other embodiments of the invention may be conceived without departing substantially from the spirit and scope of the invention set forth in the accompanying claims.

What is claimed is:

1. An adaptor mount for securing accessory equipment conveniently and detachably to a pair of parallel spaced-apart mounting blades affixed to a vehicle, said adaptor mount comprising:

a substantially planar front plate member;

a tubular mounting sleeve fixedly secured to said front plate member and extending from said front plate member on the opposite side thereof from said side wall members;

said mounting sleeve comprising a body portion of rectangular cross-sectional configuration having a central longitudinal opening configured to receive a mating portion of an accessory equipment device in telescopic relationship;

said mounting sleeve having an annular reinforcing portion at the end remote from said front plate in the form of an enlarged annular collar having a larger diameter than the outer diameter of said sleeve said mounting sleeve further having a transverse opening extending completely therethrough for receiving a locking pin;

a first pair of parallel spaced-apart side wall members extending from said front plate member and defining between them a first blade-receiving channel lying parallel to a plane normal to said front plate;

said first pair of parallel spaced-apart side wall members having a pin-receiving aperture extending transversely therethrough for receiving a locking pin inserted transversely through both of said first pair of sidewalls;

a second pair of parallel spaced-apart side wall members extending from said front plate member and defining between them a second blade-receiving channel lying parallel to a plane normal to said front plate;

said second pair of parallel spaced-apart side wall members having a pin-receiving aperture extending transversely therethrough for receiving a locking pin inserted transversely through both of said second pair of sidewalls;

said first blade-receiving channel being spaced a predetermined distance from said second blade-receiving channel for allowing said first and second channels to simultaneously receive separate ones of said pair of parallel spaced-apart mounting blades affixed to a vehicle.

2. An adaptor mount for securing accessory equipment conveniently and detachably to a pair of parallel spaced-apart mounting blades affixed to a vehicle, said adaptor mount comprising:

a substantially planar front plate member;

a tubular mounting sleeve fixedly secured to said front plate member, open at both ends, and extending completely through said front plate in a substantially normal direction;

said mounting sleeve comprising a body portion of rectangular cross-sectional configuration having a central longitudinal opening configured to receive a mating portion of an accessory equipment device in telescopic relationship;

said mounting sleeve further having a transverse opening extending completely therethrough for receiving a locking pin;

a first pair of parallel spaced-apart side wall members extending from said front plate member and defining between them a first blade-receiving channel lying parallel to a plane normal to said front plate;

said first pair of parallel spaced-apart side wall members having a pin-receiving aperture extending transversely therethrough for receiving a locking pin inserted transversely through both of said first pair of sidewalls;

a second pair of parallel spaced-apart side wall members extending from said front plate member and defining between them a second blade-receiving channel lying parallel to a plane normal to said front plate;

said second pair of parallel spaced-apart side wall members having a pin-receiving aperture extending transversely therethrough for receiving a locking pin inserted transversely through both of said second pair of sidewalls;

said first blade-receiving channel being spaced a predetermined distance from said second blade-receiving channel for allowing said first and second channels to simultaneously receive separate ones of said pair of parallel spaced-apart mounting blades affixed to a vehicle.

* * * * *